United States Patent [19]
Abdelrazig et al.

[11] Patent Number: 5,326,396
[45] Date of Patent: Jul. 5, 1994

[54] LOW SHRINKAGE CEMENT COMPOSITION

[75] Inventors: Baha E. I. Abdelrazig, Columbia; Ellis M. Gartner, Silver Spring; David F. Myers, Columbia, all of Md.

[73] Assignee: W. R. Grace & Co.-Conn., New York, N.Y.

[21] Appl. No.: 99,088

[22] Filed: Jul. 29, 1993

[51] Int. Cl.$^5$ ............................................. C04B 24/12
[52] U.S. Cl. .................... 106/808; 106/727; 106/819; 106/823
[58] Field of Search ............... 106/808, 819, 823, 727; 562/555

[56] References Cited

U.S. PATENT DOCUMENTS

| | | | |
|---|---|---|---|
| 3,459,570 | 8/1969 | Serafin | 106/727 |
| 3,574,711 | 4/1971 | Robeton | 560/157 |
| 4,116,706 | 9/1978 | Previte | 106/823 |

FOREIGN PATENT DOCUMENTS

| | | | |
|---|---|---|---|
| 551298 | 4/1977 | U.S.S.R. | |
| 629193 | 9/1978 | U.S.S.R. | |
| 2030986 | 4/1980 | United Kingdom | 106/808 |
| 2056963 | 3/1981 | United Kingdom | 106/808 |

OTHER PUBLICATIONS

Chemical Abstract #CA98(5):33373a "Relative toxicity and persistence . . . control of grain insects" (1982) (abstract only).

*Primary Examiner*—Anthony Green
*Attorney, Agent, or Firm*—Howard J. Troffkin

[57] ABSTRACT

The present invention is directed to a cement admixture and the resultant cement composition capable of inhibiting drying shrinkage and crack formation resulting therefrom.

18 Claims, No Drawings

LOW SHRINKAGE CEMENT COMPOSITION

BACKGROUND OF THE INVENTION

The present invention is directed to a cement composition admixture capable of reducing drying shrinkage and cracking resulting therefrom.

One of the major disadvantages of conventional cement compositions is that they tend to shrink during curing of the composition. This shrinkage results in cracks, and other defects in the resultant structure. Such cracks have both appearance and physical defects to the structure. For example, water can enter in the cracks and further deteriorate the structure through freeze-thaw pressures exerted by the water on the cement composition.

Various admixtures have been suggested as useful in reducing drying shrinkage and the resultant cracking. Japanese Patent Laid-Open Application 81/37259 and Japanese 87/10947 disclose the use of alcohol-alkylene oxide and alkylphenol-alkylene oxide adducts as useful for this purpose. However, these materials must be used in large dosages which causes their usage to be too expensive for practical use. $C_4$–$C_6$ alkyl alcohols, as disclosed in U.S. Pat. No. 5,181,961, have been suggested for use in inhibiting drying shrinkage. However, the alcohols are not highly effective under dry conditions and they tend to leach out under any wet condition encountered. In addition the lower alcohols have high vapor pressure at ambient conditions and are, therefore, difficult to handle.

A need continues to exist for a cement composition admixture and a resultant cement composition capable of inhibiting drying shrinkage. The admixture must be inexpensive, readily handleable at the job site and provide the desired inhibiting effect at low dosage levels.

SUMMARY OF THE INVENTION

The present invention provides a cement composition, capable of inhibiting drying shrinkage to cement compositions. The admixture provides the desired result under various environment conditions, can be used in low dosages and is readily handled at the job site. The subject admixture comprises at least one compound of the formula $$R_1NH_2 \qquad \qquad I$$

or $$R_1-X-\overset{\overset{\displaystyle O}{\|}}{C}-R_2 \qquad \qquad II$$

wherein $R_1$ represents a $C_4$–$C_6$ alkyl group, X represents an oxygen atom or secondary nitrogen group (NH), and $R_2$ represents hydrogen atom or $C_1$–$C_3$ alkyl group when X is a secondary amine and $R_2$ represents a primary amino group or $-CH_2C(O)CH_3$ when X represents oxygen atom.

DETAILED DESCRIPTION OF THE INVENTION

It has been presently found that compounds of Formula I, as fully described herein below, are compounds capable of inhibiting drying shrinkage and the resulting stress cracks normally encountered in cement compositions.

Cement compositions undergo a sequence of stages during its complete curing process. From the initial hydration of the cement until set, the mass undergoes certain dimensional changes, including plastic shrinkage. The mass can, however, substantially overcome and correct for the stresses which occur at this stage. However, subsequent to set, the mass undergoes further dimensional changes which are called dry changes, including drying shrinkage. Although these changes are small in magnitude, they give rise to internal and external stresses which result in the formation of permanent cracks and deformations to the mass.

The admixture unexpectedly found to inhibit dry shrinkage is composed of at least one compound represented by the formula:

$$R_1NH_2 \qquad \qquad I$$

or $$R_1-X-\overset{\overset{\displaystyle O}{\|}}{C}-R_2 \qquad \qquad II$$

wherein $R_1$ represents a $C_4$–$C_6$ alkyl group as, for example, n-butyl, iso-butyl, tert-butyl, n-pentyl, iso-pentyl, n-hexyl and the like; X represents an oxygen atom or a secondary nitrogen group —NH—; and $R_2$ represents a hydrogen atom or $C_1$–$C_3$ alkyl group, when X is a secondary nitrogen group and $R_2$ represents a primary amino group or $-CH_2C(O)CH_3$ when X represents an oxygen atom.

The preferred compounds of the present invention are alkyl formamides, such as N-butyl formamide, N-pentyl formamide, N-butyl acetamide and the like; alkyl acetoacetates, such as butyl acetoacetates, pentyl acetoacetates and the like and alkylamines such as butylamine.

The present cement composition admixture are solids or liquids which can be readily transported and either dispersed in water or water-alcohol media or made solutions therewith. Thus, the subject admixtures can be introduced into and made part of a dry mix of cement and the subject admixture. Such mixtures can be formed with from about 90 to 99 weight percent cement and 1 to 10 (preferably 1 to 5) weight percent of the present admixture. For example, the admixture of Formula I can be readily mixed with conventional portland cement to form a dry powder blend which when later hydrated in forming the desired cement composition, provides a composition which exhibits the desired inhibiting properties with respect to drying shrinkage. Alternately, the present admixture can be added (either in its solid state or as a dispersion) as part of the mixing of components used in forming the cement composition. For example, one or more of the present compounds of the above formula can be formed into an aqueous or aqueous-alcoholic solution or dispersion to be used as an admixture which can be readily introduced into the cement composition at the job site or at the ready-mix batching plant.

The presently described admixture can be used to inhibit drying shrinkage in a variety of cement compositions, such as pastes (cement and water), mortars (cement, sand or other small particulate matter and water) and concretes (cement, sand, gravel and water). Suitable cement include ordinary portland cement (e.g. ASTM Type I), special portland cement (high early strength portland cement and moderate heat portland cement), portland blast furnace slag cement, portland fly ash cement, as well as blended and high aluminous cement, and the like.

In the preparation of a cement composition of the invention, aggregates such as gravel, sand, pumice and burned perlite may be used in known manners according to the specific application. Further, conventional water-reducing agents, air-entraining agents, expansive agents, shrinkage-reducing agents other than the present invention, and other known admixtures for mortar or concrete may be jointly used.

Examples of known additives for mortar and concrete include hardening accelerators, such as metal chlorides (e.g. calcium chloride), hardening retarders such as saccharides, starches, hydroxy carboxylic acids, and glycerol; and corrosion inhibitors for reinforcing steel, such as sodium nitrite and calcium nitrite. The amount of such an optional additives added to cement is usually 0.1–5 wt %.

The amount of water to be added to form the composition of the present invention is not critical as long as it is sufficient to effect hydration. The water/cement ratio is usually about 0.3 to 0.6, and preferably from 0.35 to 0.5.

It has been found that the present admixture provides a further enhanced cement composition when used in combination with a water-reducing agent. Although the subject compounds of the above formula can be used alone to provide both drying shrinkage inhibition and reduction in water, compositions which have both the subject organic compounds of Formula I and water-reducing agent provides enhanced properties. Examples of suitable, water-reducing agents are naphthalene-sulfonate-formaldehyde condensates, lignin-sulfonates, melamine-sulfonate-formaldehydes, polyacrylates, and the like and mixtures thereof. The amount of such water reducing agent to be used can range in from 0.05 to 5 weight percent based on the cement content of the formed composition.

The water-reducing agent can be added to the cement composition in ordinary manners, as part of any other admixture or with the present drying shrinkage control agent when added to the mixture of cement, aggregate and water.

The drying shrinkage inhibiting agent of the present invention can be added either to a dry cement or to a mixture of cement and other appropriate components forming the desired cement composition. Because the present admixture is either a solid or a low vapor pressure, high boiling liquid, it can be readily handled and stored without concern of evaporation and lack of potency at time of use. Thus, the present shrinkage reducing agent can be either dry mixed with the cement powder, or spray applied to the cement powder with further mixing. When the cement composition is a cement paste, the cement composition can be prepared by using a pre-mixed cement agent which is mixed with water, or a prescribed amount of the shrinkage-reducing agent is first dissolved in water or water-alcohol solution and then the solution is mixed with cement. If the cement composition is a mortar or concrete, a composition of the shrinkage reducing agent in an aqueous solution, emulsion or dispersion may be first prepared and then mixed with cement and aggregate, or a given amount of the shrinkage-reducing agent is added to a mixture of cement, water, and aggregate while they are being stirred.

The cement composition may be cured using any of the atmospheric, wet air, water, and or heat-accelerated (steam, autoclave, etc.) curing techniques. If desired, two or more such techniques may be combined. The respective curing conditions may be the same as in conventional ones.

The present shrinkage reducing agents of the present invention are effective in low dosages of from about 1 to 10 weight percent based on the cement component of the cement composition. It is preferred to use from 1 to 5 and most preferably to use from 1 to 4 weight percent of the present agent based on cement content. The low dosage and ease of formation of the present agent provides a cost effective dry shrinkage and crack control agent for cement compositions. When present shrinkage-reducing and water-reducing agents are used in combination, the weight ratio of these components are 100:1 to 1:5 and preferably from 10:1 to 1:2.

The following example is given for illustrative purposes only and are not meant to be a limitation on the claims appended hereto. All parts and percentages are by weight unless otherwise indicated.

EXAMPLE 1

A micro-concrete composition composed of a mortar specifically designed to simulate concrete was formed using portland cement, and fine aggregate of varying particle size. The composition was formed of the following mix:

| Components | Part by Weight |
|---|---|
| Cement | 100 |
| Sand A | 60 |
| Sand B | 54 |
| Sand C | 54 |
| Sand D | 102 |

Sand A had the following particle size distribution: 0.000% retained on 600 micron sieve size openings (reported as "0.00%/600"), 0.4%/425, 2%/300, 8%/212, 33%/150, 39%/106, 15%/75 and 2.6%/53.

Size B had a particle size of 150 to 1180 micron in accordance with ASTM C-778.

Sand C had a particle size of 600 to 1180 micron in accordance with ASTM C-778.

Sand D had the following particle size distribution: 0.00%/5000, 12.7%/2360, 55.7%/1700, 25.5%/1180, 5.4%/850 and 0.7/600.

The various sand components were mixed together using a low speed mixer. The cement was then added with further mixing to form a substantially uniform blend. To this blend was added 42 parts water to provide a water/cement ratio of 0.42. After one minute of mixing, isobutyl amine was added at the rate of 1.97% by weight of cement. Mixing was continued at low speed for 8 minutes and the mix was then poured into four molds having dimensions of 25×25×285 mm. The specimens were cured for 24 hours in a chamber maintained at 100% relative humidity, demoulded and then cured for additional 6 days at 100% relative humidity. Each of the bars was measured at regular intervals for changes in linear length using a comparator described in ASTM C-490.

The results are given in Table I below with respect to change in length (measured length minus original length divided by original length) with respect to time. Thus, a negative value connotes shrinkage in the length of the sample.

For comparative purposes, samples were formed in the same manner as described above except that the isobutyl amine was omitted (control). The samples were tested in the same manner as described above and the results are given in Table I.

TABLE I

| | UNRESTRAINED DRYING SHRINKAGE LENGTH CHANGE × $10^{-6}$ | | |
|---|---|---|---|
| Example | 2 Week | 4 Week | 10 Week |
| Isobutyl amine | −168.7 | −353.5 | −490 |
| Control | −444 | −667 | −750 |

The above data shows that samples which contained shrinkage reducing agent, isobutylamine, of the present invention exhibited substantially less drying shrinkage in comparison to samples without the subject isobutyl amine. Specifically, samples with isobutylamine exhibited about 60% less drying shrinkage after the first two weeks, when compared with the control prepared with water only.

EXAMPLE 2

A mix was prepared as in Example 1 above, except that 2.73% of N-t-butyl formamide was added instead of isobutylamine. The liquid N-t-butyl formamide was added neat after the addition of the mixing water which was added at the ratio of 0.42. The shrinkage data obtained for the formamide containing mortar samples are shown in Table 2.

TABLE 2

| | UNRESTRAINED DRYING SHRINKAGE LENGTH CHANGE × $10^{-6}$) | | |
|---|---|---|---|
| EXAMPLE | 2 WEEKS | 4 WEEKS | 10 WEEKS |
| N-t-butyl formamide | −257.5 | −473.6 | −600 |
| Control | −444 | −667 | −750 |

The above data shows that samples which contained N-t-butyl formamide shrinkage reducing agent of the present invention exhibited substantially less drying shrinkage in comparison to the control sample without the subject formamide. Specifically, the samples with N-t-butyl formamide showed 42% less drying shrinkage in comparison to the sample prepared with water only.

EXAMPLE 3

A mix was prepared as in Example 1 above, except that t-butyl acetoacetate was added instead of isobutyl amine at the rate of 4.27% by weight of cement to compare its performance at equal basis with isobutyl amine and N-t-butyl formamide.

The results with respect to change in length (measured length minus original length divided by original length) with time are given in Table 3 below.

TABLE 3

| | UNRESTRAINED DRYING SHRINKAGE LENGTH CHANGE (× $10^{-6}$) | | |
|---|---|---|---|
| EXAMPLE | 2 WEEKS | 4 WEEKS | 10 WEEKS |
| t-butylacetoacetate | −297.5 | −479 | −650 |
| Control | −444 | −667 | −750 |

The above data shows that samples which contained t-butyl acetoacetate shrinkage reducing agent of the present invention exhibited substantially less drying shrinkage in comparison to samples without the subject acetoacetate. Specifically, the shrinkage reduction was about 33% less after the first two weeks in comparison to the sample prepared with water only.

We claim:

1. A cement admixture comprising at least one compound of the Formula I:

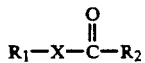

wherein $R_1$ represents a $C_4$-$C_6$ alkyl group, X represents an oxygen atom or a secondary nitrogen group (—NH—), and $R_2$ represents a hydrogen atom or a $C_1$-$C_3$ alkyl group when X is a secondary amine, or $R_2$ represents a primary nitrogen group (—NH$_2$) or a —CH$_2$C(O)CH$_3$ group when X is an oxygen atom; and at least one cement water reducing agent.

2. The admixture of claim 1 wherein $R_1$ is butyl.

3. The admixture of claim 1 wherein $R_2$ is hydrogen and X is a secondary nitrogen group.

4. The admixture of claim 1 wherein the compound of Formula I is selected from the group consisting of butyl formamide and butyl acetoacetate.

5. An improved cement powder composition comprising from 99 to 90 weight percent of a cement powder selected from a portland cement, blended cement or aluminous cement and substantially uniformly dispersed therein from 0.1 to 10 weight percent of at least one compound of Formula I:

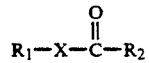

wherein $R_1$ represents a $C_4$-$C_6$ alkyl group, X represents an oxygen atom or a secondary nitrogen group (—NH—), and $R_2$ represents a hydrogen atom or $C_1$-$C_3$ alkyl group when X is a secondary nitrogen group or $R_2$ represents a primary nitrogen group (—NH$_2$) or a —CH$_2$C(O)CH$_3$ group when X is an oxygen atom.

6. The composition of claim 5 wherein $R_1$ is butyl.

7. The composition of claim 5 wherein $R_2$ is hydrogen and X is a secondary nitrogen group.

8. The composition of claim 5 wherein the compound of Formula I is selected from the group consisting of butyl formamide and butyl acetoacetate.

9. An improved concrete composition comprising cement, sand, aggregate and water and having substantially uniformly dispersed therein from 0.1 to 10 weight percent based on the cement of at least one compound of the Formula I:

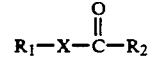

wherein $R_1$ represents a $C_4$-$C_6$ alkyl group, X represents an oxygen atom or a secondary nitrogen group (—NH—), and $R_2$ represents a hydrogen atom or $C_1$-$C_3$ alkyl group when X is a secondary amine, or $R_2$ represents nitrogen C(O)CH$_3$ group when X is an oxygen atom.

10. The composition of claim 9 which further contains from about 0.05 to 5 weight percent based on the cement content of said composition of a cement water reducing agent.

11. The composition of claim 9 wherein $R_1$ is butyl.

12. The composition of claim 10 wherein $R_1$ is butyl.

13. The composition of claim 9 wherein $R_2$ is hydrogen and X is a secondary nitrogen group.

14. The composition of claim 10 wherein $R_2$ is hydrogen and X is a secondary nitrogen group.

15. The composition of claim 9 wherein the compound of Formula I is selected from N-butyl formamide.

16. The composition of claim 10 wherein the compound of Formula I is selected from N-butyl formamide.

17. The composition of claim 9 wherein the compound of the formulae is selected from butyl acetoacetate.

18. The composition of claim 10 wherein the compound of formulae is selected from butyl acetoacetate.

* * * * *

UNITED STATES PATENT AND TRADEMARK OFFICE
CERTIFICATE OF CORRECTION

PATENT NO. : 5,326,396
DATED : July 5, 1994
INVENTOR(S) : Baha E.I. Abdelrazig; Ellis M. Gartner; David F. Myers It is certified that error appears in the above-indentified patent and that said Letters Patent is hereby corrected as shown below:

Column 6, line 63, delete "nitrogen" and insert — a primary nitrogen group (—$NH_2$) or —

Column 6, line 64, delete "C(O)$CH_3$" and insert — —$CH_2C(O)CH_3$ —

Signed and Sealed this

Twenty-seventh Day of September, 1994

Attest:

BRUCE LEHMAN

Attesting Officer     *Commissioner of Patents and Trademarks*